US008856942B2

(12) United States Patent
Belenky

(10) Patent No.: US 8,856,942 B2
(45) Date of Patent: *Oct. 7, 2014

(54) PRIVACY-AWARE CONTENT PROTECTION SYSTEM

(75) Inventor: Yaacov Belenky, Maaleh Adumim (IL)

(73) Assignee: Cisco Technology Inc, San Jose, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 13/527,381

(22) Filed: Jun. 19, 2012

(65) Prior Publication Data

US 2012/0290843 A1    Nov. 15, 2012

Related U.S. Application Data

(63) Continuation of application No. 12/311,539, filed as application No. PCT/IL2007/001314 on Oct. 30, 2007, now Pat. No. 8,239,957.

(30) Foreign Application Priority Data

Nov. 2, 2006 (IL) .......................................... 179023
Mar. 29, 2007 (IL) .......................................... 182338

(51) Int. Cl.
| | |
|---|---|
| G06F 7/04 | (2006.01) |
| G06F 17/30 | (2006.01) |
| H04N 7/16 | (2011.01) |
| G06F 21/62 | (2013.01) |
| G06F 21/10 | (2013.01) |
| H04L 9/08 | (2006.01) |
| G06F 21/00 | (2013.01) |

(52) U.S. Cl.
CPC ................ G06F 21/10 (2013.01); G06F 21/62 (2013.01); H04L 9/088 (2013.01); H04L 9/085 (2013.01); G06F 21/00 (2013.01)
USPC ................... 726/26; 726/27; 726/33; 705/50; 705/54; 705/57; 705/58

(58) Field of Classification Search
CPC ................... G06Q 2220/10; G06Q 2220/127; G06Q 2220/145; G06Q 2220/16; G06Q 2220/165; G06Q 2220/18; G06F 21/00; G06F 21/10; G06F 21/62; G06F 21/6209; H04L 9/085; H04L 9/088
USPC ................. 726/26, 27, 33; 705/50, 54, 57, 58
See application file for complete search history.

(56) References Cited

U.S. PATENT DOCUMENTS

| | | |
|---|---|---|
| 5,276,737 A | 1/1994 | Micali |
| 5,841,865 A | 11/1998 | Sudia |

(Continued)

FOREIGN PATENT DOCUMENTS

| | | |
|---|---|---|
| EP | 0 325 238 B1 | 1/1994 |
| WO | WO 99/36917 | 7/1999 |
| WO | WO 02/079955 A2 | 10/2002 |

OTHER PUBLICATIONS

Ed Felton, "Google Video and Privacy" (Jan. 20, 2006) at www.freedom-to-tinker.com/?p=956.

(Continued)

*Primary Examiner* — Evans Desrosiers
*Assistant Examiner* — Daniel Potratz
(74) *Attorney, Agent, or Firm* — Husch Blackwell LLP

(57) ABSTRACT

A method and system are disclosed for preventing rendering of content at overlapping time periods on more rendering devices than permitted by a license associated with the content.

18 Claims, 5 Drawing Sheets

(56) References Cited

U.S. PATENT DOCUMENTS

| | | | |
|---|---|---|---|
| 6,865,555 B2 * | 3/2005 | Novak | 705/59 |
| 6,891,953 B1 | 5/2005 | DeMello et al. | |
| 6,959,394 B1 * | 10/2005 | Brickell et al. | 726/5 |
| 7,051,200 B1 * | 5/2006 | Manferdelli et al. | 713/153 |
| 7,421,412 B2 * | 9/2008 | Ramanathan | 705/59 |
| 7,512,986 B2 | 3/2009 | Shen-Orr et al. | |
| 8,001,608 B2 * | 8/2011 | Venters et al. | 726/26 |
| 2005/0080746 A1 | 4/2005 | Zhu et al. | |
| 2005/0097558 A1 | 5/2005 | de Bonet | |
| 2005/0135613 A1 | 6/2005 | Brandenburg et al. | |

OTHER PUBLICATIONS

Adi Shamir, "How to Share a Secret", Communications of the ACM, vol. 22, No. 11 pp. 612 613 (Nov. 1979).

* cited by examiner

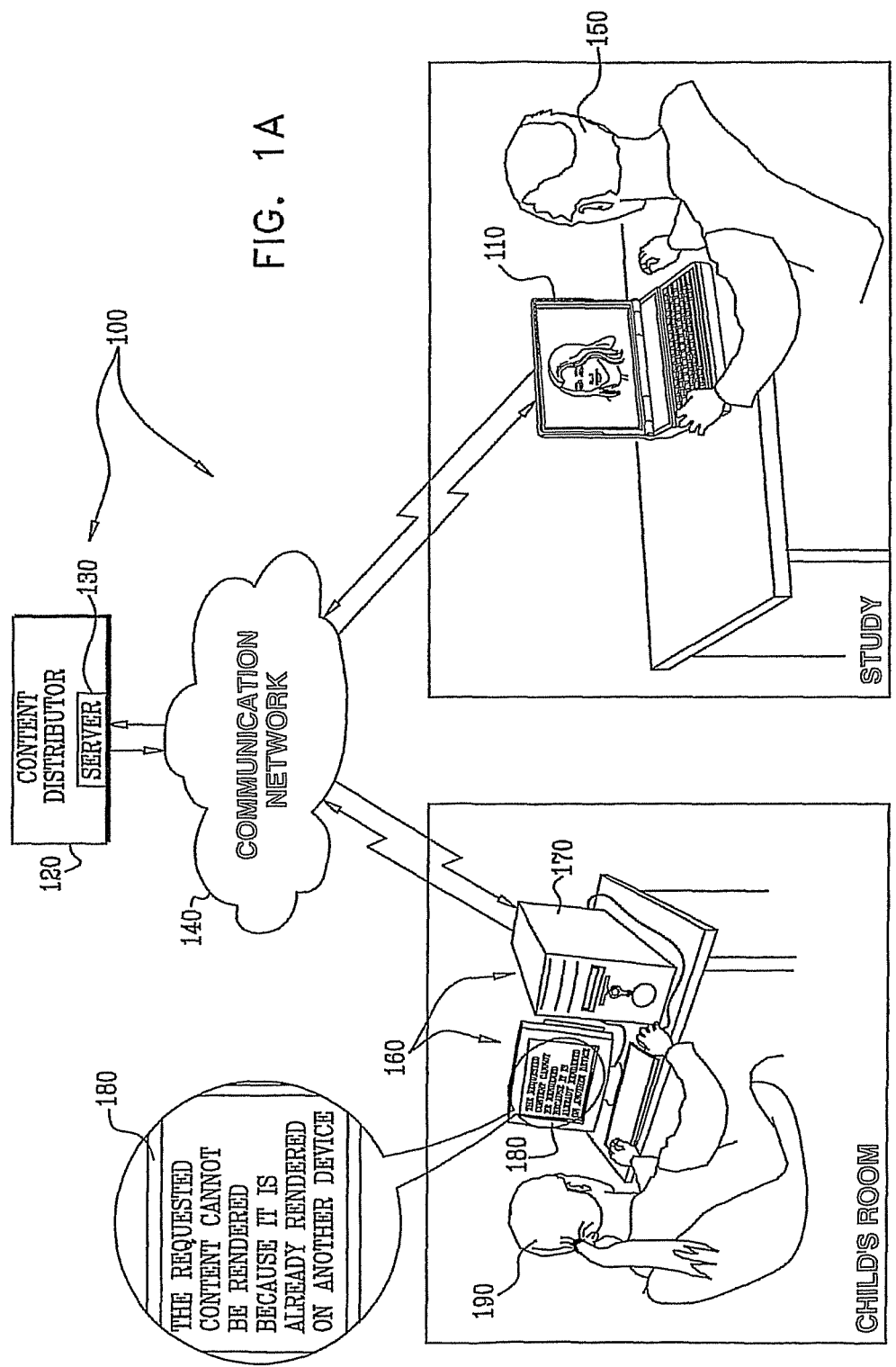

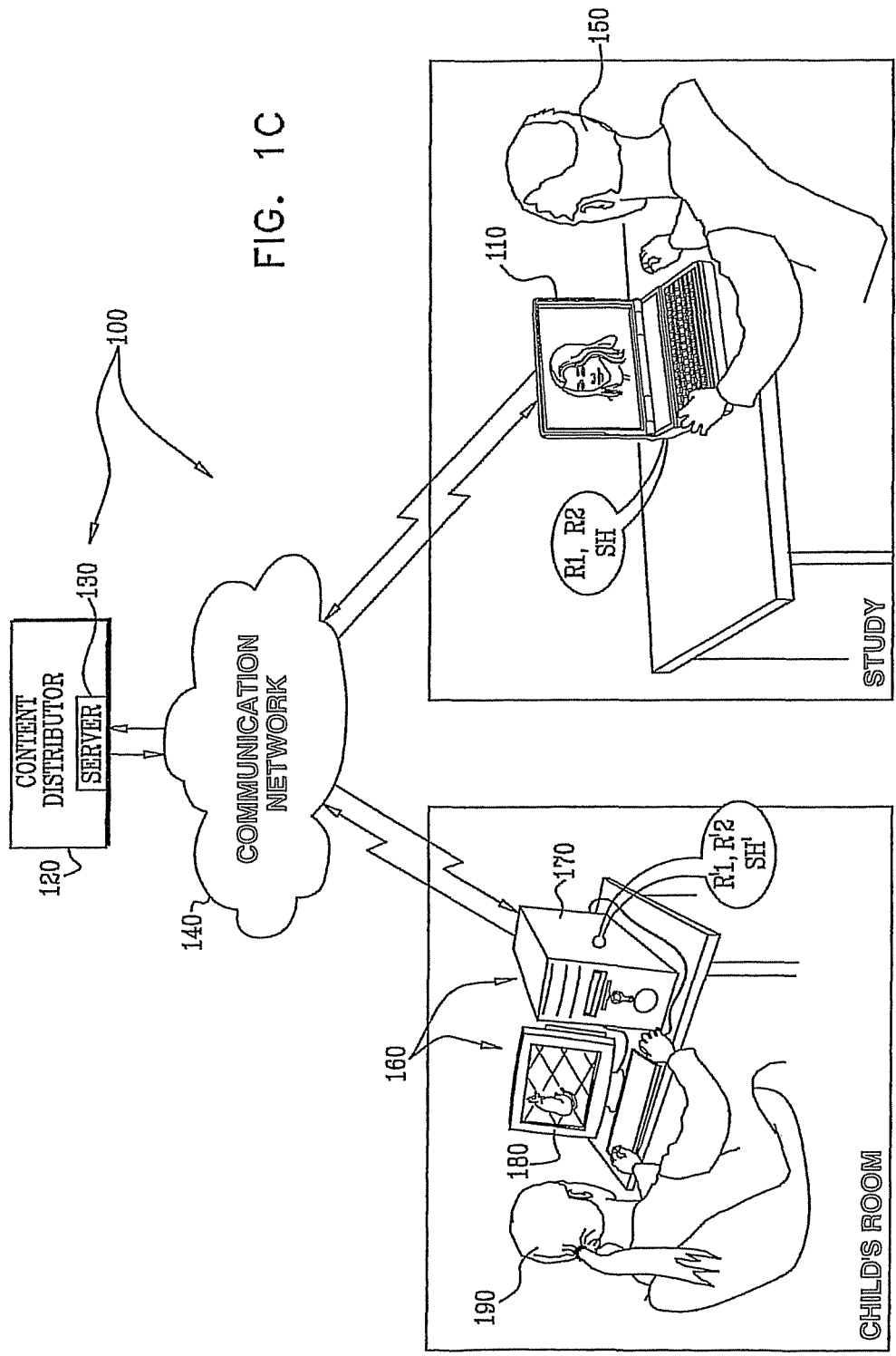

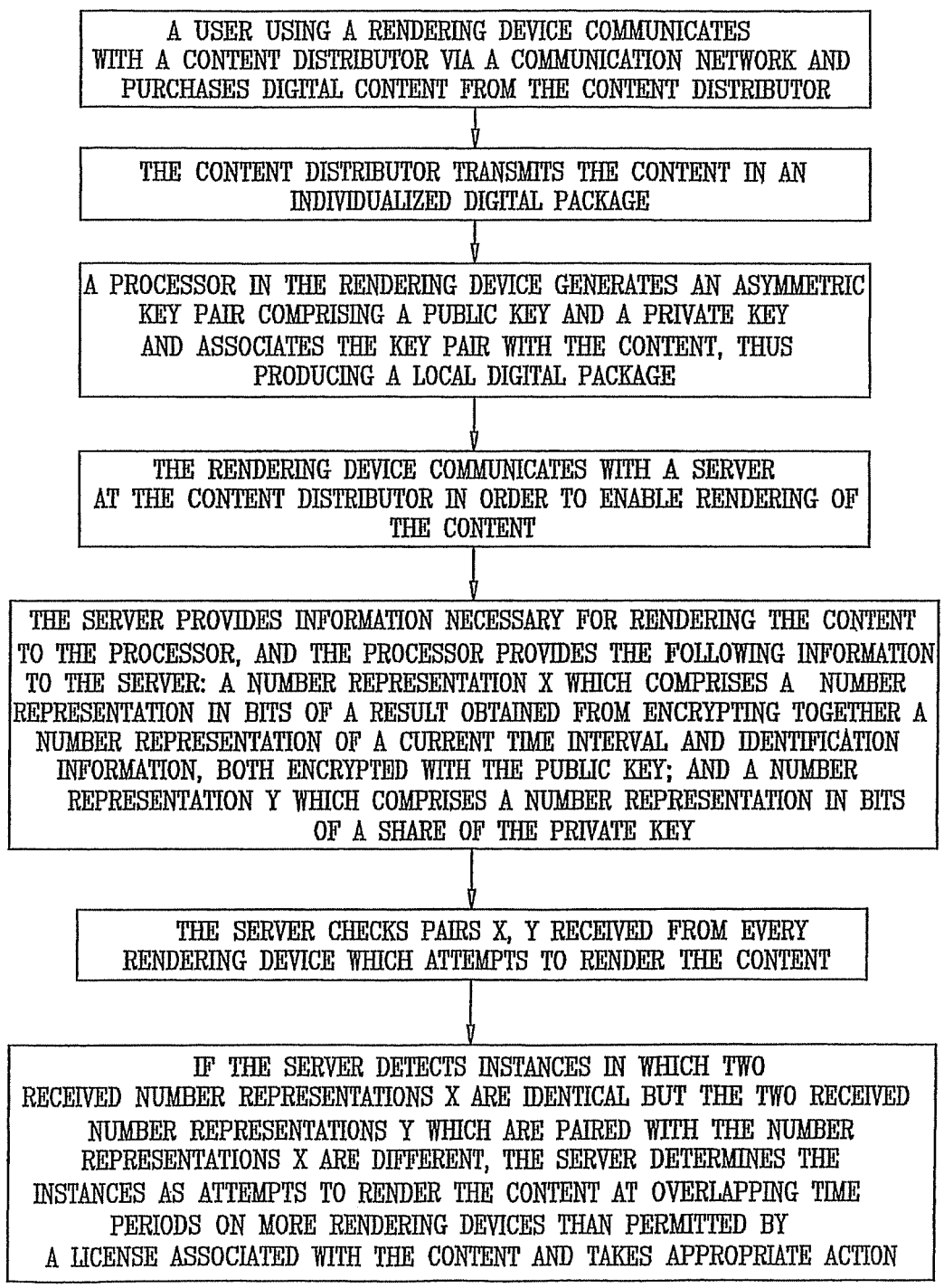

PRIVACY-AWARE CONTENT PROTECTION SYSTEM

The present application is a continuation of application Ser. No. 12/311,539, which is a 35 USC §371 application of PCT Patent Application PCT/IL2007/001314, filed on 30 Oct. 2007, which was published in the English language as WO 2008/053471 on 8 May 2008, and which claims priority from the following applications: Israel Patent Application No. 179023 of NDS Limited, filed 2 Nov. 2006; and Israel Patent Application No. 182338 of NDS Limited, filed 29 Mar. 2007.

FIELD OF THE INVENTION

The present invention relates to digital rights management (DRM) and to distribution and use of content subjected to DRM.

BACKGROUND OF THE INVENTION

Distribution of music and video via a network such as the Internet is considered today as a highly-desired service. However, such a service may be subject to piracy and therefore efficient digital rights management (DRM) schemes are necessary to protect owner rights of content.

Conventional DRM schemes have drawbacks in that they affect privacy and anonymity of users. For example, some conventional DRM schemes require identification of a rendering device or binding of content to the rendering device which may reveal, indirectly, identity of an owner of the rendering device with which the content is associated. Furthermore, user actions required by some conventional DRM schemes, particularly when such user actions are associated with the content, may reveal private information, such as that a particular user uses specific content, identity of a user using the content, time periods when the user uses the content, and content preferences of the user.

Some aspects of technologies and related material that may be useful in understanding the present invention are described in the following publications:

published PCT Patent Application WO 02/079955 of NDS Limited, and corresponding U.S. patent application Ser. No. 10/472,286 of Shen-Orr et al, which describe a system and a method for providing variable security mechanisms for securing digital content;

a publication entitled "Google Video and Privacy", by Ed Felten, dated 20 Jan. 2006, at www.freedom-to-tinker.com/?p=956;

an article entitled "How to share a secret", by Adi Shamir in *Communications of the ACM*, 22(1), pages 612-613, 1979, available at www.cs.tau.ac.il/~bchor/Shamir.html;

European Patent EP 0325238, which describes improved variants of the Fiat-Shamir identification and signature scheme;

U.S. Pat. No. 6,891,953 to DeMello et al, which describes a server architecture for a digital rights management system that distributes and protects rights in content;

Published US Patent Application 20050097558 of de Bonet, which describes systems and methods for architectures for a compact and efficient multimedia player; and Published US Patent Application 20050135613 of Brandenburg et al, which describes a device and method for generating encrypted data, for decrypting encrypted data and for generating re-signed data.

The disclosures of all references mentioned above and throughout the specification, as well as the disclosures of all references mentioned in those references, are hereby incorporated herein by reference.

SUMMARY OF THE INVENTION

The present invention, in preferred embodiments thereof, seeks to provide a method and system for preventing unauthorized rendering and use of distributed electronic content. Prevention of unauthorized rendering and use of the distributed electronic content is preferably performed while maintaining privacy and anonymity of users of the content and without identification of rendering devices that are to render the content or binding of the content to the rendering devices. Particularly the present invention seeks to prevent rendering and use of the content at overlapping time periods on more rendering devices than permitted by a license associated with the content.

The term "render" is used, in all its grammatical forms, throughout the present specification and claims to refer to any appropriate mechanism or method of making content palpable to one or more of the senses. In particular and without limiting the generality of the foregoing, "render" refers not only to display of video content but also to playback of audio content.

The term "binding of content to a rendering device" is used throughout the present specification and claims to refer to an association of content with a rendering device which is allowed to render the content, which association may reveal an identity of the rendering device and consequently an identity of an owner of the rendering device.

In preferred embodiments of the present invention, a user using a rendering device communicates with a content distributor via a communication network and purchases digital content from the content distributor with, for example, a single copy license which specifies that only one copy of the content is permitted to be rendered at a time on a single rendering device. It is, however, appreciated that the content may alternatively be purchased with a multiple copy license which specifies that more than one copy of the content is permitted to be rendered at overlapping time periods on more than one rendering device.

The content distributor preferably transmits the content in association with the following: first software that is operative to receive the content and to associate keys with the content; identification information (ID) that is associated with the user; and second software that comprises a player for rendering the content. It is appreciated that the content distributor may, by way of a non-limiting example, transmit the content, the first software, the ID that is associated with the user, and the second software in an individualized digital package. The first software and the second software may, by way of a non-limiting example, be provided in a single combined software package. The content is preferably protected to avoid piracy and unauthorized use thereof. Protection of the content may, for example, be provided by scrambling or encrypting the content.

Upon receipt of the content, the first software, the ID that is associated with the user, and the second software at the rendering device, a processor comprised in the rendering device or associated with the rendering device generates an asymmetric key pair comprising a public key and a private key by interacting with the content distributor and using the first software. The processor then associates the key pair with the content, thus producing a local digital package which comprises the following: the content associated with the key pair; the first software; the ID that is associated with the user; and the second software.

Preferably, the processor in the rendering device interacts with the content distributor for generating the key pair in order to overcome possible attempts to copy the content and to produce a different and illegitimate key pair which may be usable for rendering the content. In such a case, the first software preferably executes a conventional zero-knowledge proof of authenticity scheme in which the content distributor proves to the processor that it knows a secret without revealing the secret itself. If the content is copied and an attempt is made to illegitimately produce a different key pair which may be usable for rendering the content, then the zero-knowledge proof of authenticity scheme executed during production of the different key pair would fail thus preventing generation of any different key pair which may be usable for rendering the content.

It is appreciated that in order to prevent possible eavesdropping during interaction between the processor in the rendering device and the content distributor, a conventional secure channel may be established between the processor and the content distributor during generation of the key pair using, for example which is not meant to be limiting, Secure Sockets Layer (SSL) as is well known in the art.

Preferably, in order for the content to be rendered or otherwise used, typically after purchase thereof, the rendering device must receive some information such as a key or a control word, which enables decryption in combination with rendering of the content. Therefore, upon the user attempting to render the content on the rendering device, the first software or the second software may preferably prompt the user to establish communication with a server associated with the content distributor in order to obtain the key or the control word.

Upon establishing the communication with the server, the server and a processor in the rendering device which runs the first software preferably execute, via the communication network, a communication protocol through which the server provides the key or the control word which is necessary for rendering or using the content to the processor after the processor provides the following information to the server: a number representation X which comprises a number representation in bits of a result obtained from encrypting together a number representation of a present time interval and the ID, both encrypted with the public key; and a number representation Y which comprises a number representation in bits of a share (SH) of the private key.

The term "share" relating to the private key or to any other secret information is used throughout the present specification and claims to refer to a portion of the private key or of the secret information which, in the absence of even one other portion of the private key or of the secret information, is insufficient to reveal the private key or the secret information. The private key or the secret information may be revealed when n+1 shares of the private key or the secret information are known, where n is an integer greater than or equal to one, but when only n shares of the private key or the secret information or less than n shares are known, the private key or the secret information cannot be revealed.

For the purposes of the present invention and without limiting the foregoing, it is assumed that, by way of a non-limiting example, the share SH of the private key together with one additional separate share of the private key are sufficient to reveal the private key.

If the content, the first software, the ID that is associated with the user, and the second software are copied to an additional rendering device, the additional rendering device will create a share SH' which is different from the share SH. If an attempt is made to render the content on both the rendering device and the additional rendering device at overlapping time periods, the server will receive from the rendering device a pair of number representations X, Y and from the additional rendering device a pair of number representations X', Y'. The number representations X and X' are identical but the number representations Y and Y' are different.

By sorting according to the X number representation parts and analyzing instances in which the number representations X and X' are identical and the number representations Y and Y' are different the server may detect is attempts to render or use the content at overlapping time periods on more rendering devices than permitted by the license associated with the content.

Additionally, using the different shares SH and SH' in the number representations Y and Y', respectively, the server may reconstruct the private key. Once the private key is known, the server may use the private key to determine the identification of the user attempting to render the content contrary to terms of the license. When the identification of such a user is known, the server may take appropriate actions, such as display a warning message to the user or apply sanctions against the user and disable rendering of the content on all rendering devices associated with the same ID.

There is thus provided in accordance with a preferred embodiment of the present invention a method for preventing rendering of content at overlapping time periods on more rendering devices than permitted by a license associated with the content, the method including transmitting the following to a rendering device of a user: the content, first software that is operative to receive the content and to associate keys with the content, identification information (ID) that is associated with the user, and second software that includes a player for rendering the content, receiving the following information from the rendering device during rendering of the content: a number representation X which includes a number representation in bits of a result obtained from encrypting together a number representation of a present time interval and the ID, both encrypted with a public key of a key pair generated at the rendering device, and a number representation Y which includes a number representation in bits of a share (SH) of a private key of the key pair generated at the rendering device, and detecting an attempt to render the content at overlapping time periods on more rendering devices than permitted by the license associated with the content based on a determination that number representations X received from separate rendering devices are identical, and number representations Y received from the separate rendering devices and paired with the number representations X received from the separate rendering devices are different.

The transmitting may include transmitting the content, the first software, the ID that is associated with the user, and the second software in an individualized digital package.

The first software and the second software may be included in a single combined software package.

The first software may include an obfuscated version of third software, the obfuscated version of the third software being produced for association with the content by using an obfuscation scheme.

The obfuscated version of the third software is preferably different from any other obfuscated version of the third software which is produced for association with other content by using the obfuscation scheme.

By way of a non-limiting example, the obfuscated version of the third software includes a source code program obfuscated by an obfuscating compiler operating thereon. The obfuscating compiler may produce different obfuscated versions of the third software by employing different implementations of a rendering device-server communication protocol.

Additionally, the method also includes, prior to the transmitting, a step of encrypting the content, and wherein the content includes the content in an encrypted form.

Further additionally, the method also includes, prior to the receiving, a step of generating the key pair at the rendering device by using the first software.

The present time interval may include a time interval of a predefined length. The time interval of a predefined length may include, by way of a non-limiting example, a 5-minute long time interval.

By way of a non-limiting example, the share SH of the private key together with at least one additional separate share of the private key are sufficient to reveal the private key.

The share SH of the private key may be based upon two numbers R1 and R2 which are generated by a number generating process which is chosen such that a first R1 and a first R2 generated by a first rendering device differ respectively from a second R1 and a second R2 generated by a second rendering device.

Each of R1 and R2 preferably includes one of the following: a random number, and a pseudo-random number.

Preferably, R1 and R2 are generated based on any one or combination of the following: a random input received from a content distributor, at least one data source that is hard to predict, at least one data source that is unique, a local random number generated by a random number generator (RNG), and a local pseudo-random number generated by a pseudo-random number generator (PRNG).

Additionally, the method also includes reconstructing, in response to the detecting, a private key of a key pair generated at one of the separate rendering devices by using different shares in the different number representations Y received from the separate rendering devices, thereby producing a reconstructed private key associated with the one of the separate rendering devices.

Further additionally, the method also includes using the reconstructed private key to determine an identification of a user of the one of the separate rendering devices, and performing at least one of the following: displaying a warning message to the user of the one of the separate rendering devices, applying sanctions against the user of the one of the separate rendering devices, and disabling rendering of the content on all the separate rendering devices.

The content includes at least one of the following: a television program, an audio program, video information, audio information, multimedia information, data, a game, and information from a computer based network.

The rendering device may preferably include at least one of the following: a computer, a personal digital assistant (PDA) having a communication interface, a set-top box (STB) associated with a television and having a communication interface, a mobile telephone, a game console associated with display, and a game console including a display.

There is also provided in accordance with a preferred embodiment of the present invention a method for use with a rendering device in a system for preventing rendering of content at overlapping time periods on more rendering devices than permitted by a license associated with the content, the method including receiving the following from a content distributor: the content, first software that is operative to receive the content and to associate keys with the content, identification information (ID) that is associated with a user of the rendering device, and second software that includes a player for rendering the content, generating a key pair including a public key and private key, generating a number representation X which includes a number representation in bits of a result obtained from encrypting together a number representation of a present time interval and the ID, both encrypted with the public key of the key pair, generating a number representation Y which includes a number representation in bits of a share (SH) of the private key of the key pair, and transmitting the number representations X and Y to the content distributor, wherein the content distributor is operative to detect an attempt to render the content at overlapping time periods on more rendering devices than permitted by the license associated with the content based on a determination that number representations X received from separate rendering devices are identical, and number representations Y received from the separate rendering devices and paired with the number representations X received from the separate rendering devices are different.

Further in accordance with a preferred embodiment of the present invention there is provided a system for preventing rendering of content at overlapping time periods on more rendering devices than permitted by a license associated with the content, the system including a transmitter which is operative to transmit the following to a rendering device of a user: the content, first software that is operative to receive the content and to associate keys with the content, identification information (ID) that is associated with the user, and second software that includes a player for rendering the content, a receiver which is operative to receive the following information from the rendering device during rendering of the content: a number representation X which includes a number representation in bits of a result obtained from encrypting together a number representation of a present time interval and the ID, both encrypted with a public key of a key pair generated at the rendering device, and a number representation Y which includes a number representation in bits of a share (SH) of a private key of the key pair generated at the rendering device, and a server which is operative to detect an attempt to render the content at overlapping time periods on more rendering devices than permitted by the license associated with the content based on a determination that number representations X received from separate rendering devices are identical, and number representations Y received from the separate rendering devices and paired with the number representations X received from the separate rendering devices are different.

The system may be comprised in a content distributor.

There is also provided in accordance with a preferred embodiment of the present invention a rendering device for use by a user in a system for preventing rendering of content at overlapping time periods on more rendering devices than permitted by a license associated with the content, the rendering device including a receiver which is operative to receive the following from a content distributor: the content, first software that is operative to receive the content and to associate keys with the content, identification information (ID) that is associated with the user, and second software that includes a player for rendering the content, a processor which is operative to generate the following: a key pair including a public key and private key, a number representation X which includes a number representation in bits of a result obtained from encrypting together a number representation of a present time interval and the ID, both encrypted with the public key of the key pair, and a number representation Y which includes a number representation in bits of a share (SH) of the private key of the key pair, and a transmitter which is operative to transmit the number representations X and Y to the content distributor, wherein the content distributor is operative to detect an attempt to render the content at overlapping time periods on more rendering devices than permitted by the license associated with the content based on a determination that number representations X received from separate rendering devices are identical, and number representations Y received from the separate rendering devices and paired with the number representations X received from the separate rendering devices are different.

BRIEF DESCRIPTION OF THE DRAWINGS

The present invention will be understood and appreciated more fully from the following detailed description, taken in conjunction with the drawings in which:

FIG. 1A is a simplified partly pictorial, partly block diagram illustration of a privacy-aware content protection system constructed and operative in accordance with a preferred embodiment of the present invention;

FIGS. 1B-1D are simplified partly pictorial, partly block diagram illustrations showing the system of FIG. 1A and information communicated, by and among elements of the system of FIG. 1A; and FIG. 2 is a simplified flowchart illustration of a preferred method of operation of the system of FIGS. 1A-1D.

DETAILED DESCRIPTION OF A PREFERRED EMBODIMENT

Reference is now made to FIG. 1A, which is a simplified partly pictorial, partly block diagram illustration of a privacy-aware content protection system 100 constructed and operative in accordance with a preferred embodiment of the present invention.

Figure 1B:
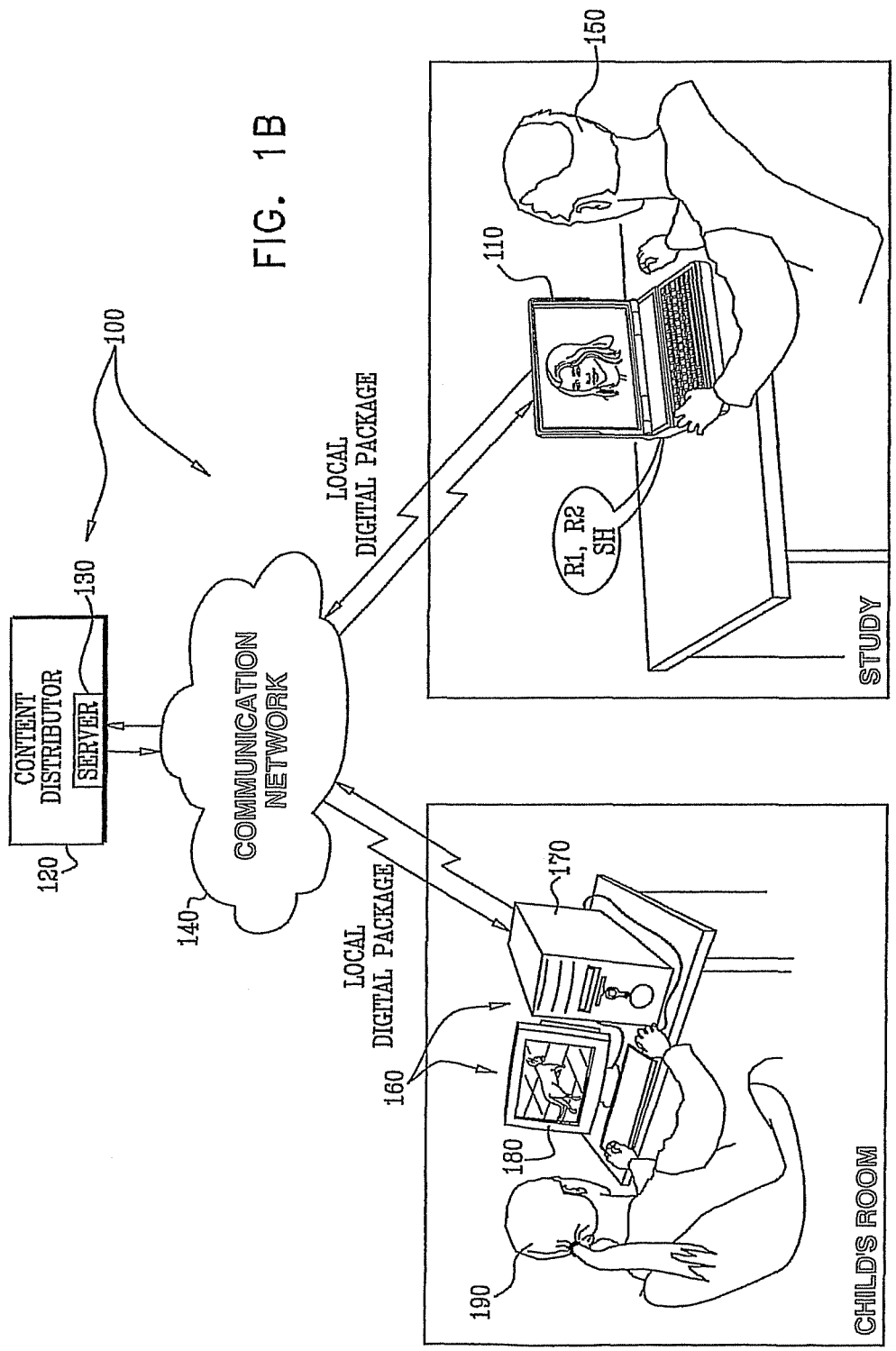
Figure 1D:
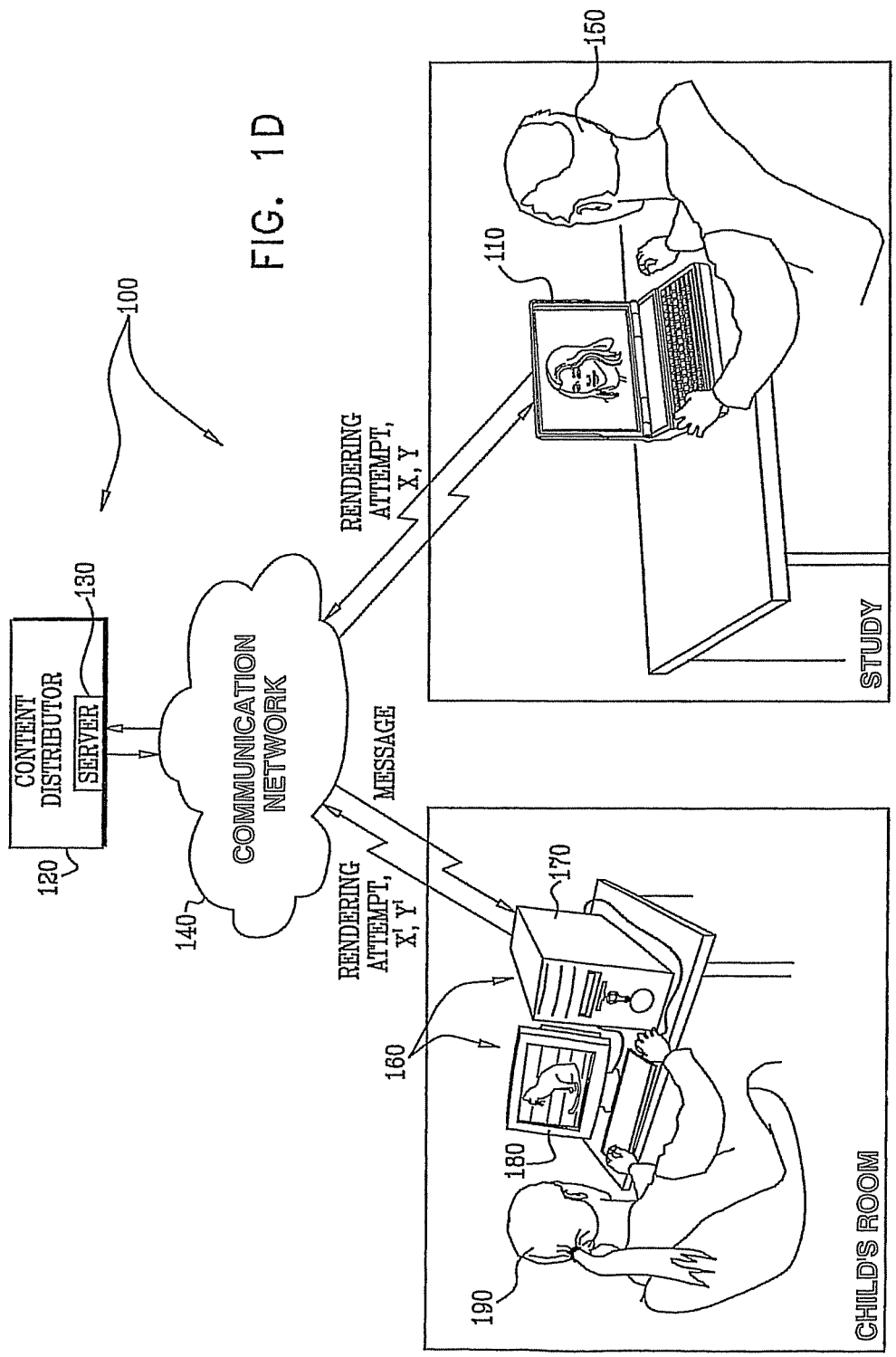

Reference is additionally made to FIGS. 1B-1D which are simplified partly pictorial, partly block diagram illustrations showing the system 100 and information communicated by and among elements of the system 100.

The system 100 preferably comprises the following elements: rendering devices 110; a content distributor 120 comprising, a server 130; and a communication network 140. By way of a non-limiting example, FIGS. 1A-1D and the description below refer to a single rendering device 110, but it is appreciated that the system 100 typically comprises a plurality of rendering devices 110.

Preferably, a user 150 using the rendering device 110 may communicate with the server 130 via the communication network 140 and purchase digital content from the content distributor 120. The digital content may comprise any appropriate type of content which may be communicated by the content distributor 120 via the communication network 140, such as, by way of a non-limiting example, at least one of the following types of content: a television program; an audio program; video information; audio information; multimedia information; data; a game; and information from a computer based network such as the Internet. Online access to information and web content from the Internet may, by way of a non-limiting example, be provided by the XSPACE software solution, commercially available from NDS Limited, One Heathrow Boulevard, 286 Bath Road, West Drayton, Middlesex UB7 0DQ, United Kingdom.

The rendering device 110 preferably comprises any appropriate device that is capable of communicating via the network 140 and of rendering the purchased content. The rendering device 110 may preferably comprise at least one of the following: a computer such as a personal computer (PC) or a laptop computer; a personal digital assistant (PDA) having a communication interface; a set-top box (STB) associated with a television and having a communication interface; a mobile telephone; and, a game console that comprises or is associated with a display.

The communication network 140 may preferably comprise at least one of the following (all not shown): the Internet; a satellite based communication network; a cable based communication network; a terrestrial broadcast based television network; a telephony based television delivery network; a mobile-telephony based television delivery network; a mobile-telephony based communication network; an Internet Protocol (IP) based television delivery network; and a computer-based communication network. Persons skilled in the art will appreciate that any appropriate communication network may be used.

One non-limiting example of a system solution for secure LP-based television and video delivery is Synamedia™, commercially available from NDS Limited, One Heathrow Boulevard, 286 Bath Road, West Drayton, Middlesex UB7 0DQ, United Kingdom.

The communication network 140 preferably comprises a two-way communication network that may, for example, be implemented using infrastructure of a two-way hybrid or non-hybrid communication network. The infrastructure of a two-way hybrid communication network may include infrastructure of at least one of the following: a combination cable-telephone network; a combination satellite-telephone network; a combination terrestrial broadcast-telephone network; and a combination satellite-computer based communication network. The infrastructure of a non-hybrid communication network may include infrastructure of any appropriate two-way non-hybrid network, such as infrastructure of at least one of the following: a non-hybrid telephone network; a non-hybrid cable network using cable modems; a non-hybrid cellular telephone network; and a satellite network in which very small aperture terminals (VSATs) are used to provide a return path.

Physical links in the communication network 140 may be implemented, according to the infrastructure, via optical links, conventional telephone links, radio frequency (RF) wired or wireless links (all not shown), or via any other appropriate links.

By way of a non-limiting example, the communication network 140 comprises the Internet, but it is appreciated that the communication network 140 may alternatively include any other appropriate network via which the digital content may be distributed.

The digital content is preferably provided by a content provider (not shown) which preferably conveys the content via the content distributor 120.

The content distributor 120 may, by way of a non-limiting example, comprise at least one of the following: processing and communication facilities of a supplier of television services, such as a cable television network operator or a satellite television network operator; processing and communication facilities of an Internet service provider (ISP); network operator processing and communication facilities; and web sites which provide information.

The content distributor 120 may, by way of a non-limiting example, be located at premises (not shown) of a content provider and linked to the network 140. The content distributor 120 preferably uses a transmitter (not shown) for conveying the content and other information via the network 140, and a receiver (not shown) for receiving information via the network 140. The content distributor 120 may convey the content by broadcasting or multicasting the content or by using unicast or point-to-point transmission for transmitting the content. It is appreciated that regardless of a way in which the content is conveyed, the content is preferably protected to avoid piracy and unauthorized use thereof. Protection of the content may, for example, be provided by scrambling or encrypting the content.

Preferably, in order to purchase the content from the content distributor 120, the user 150 operates the rendering device 110, or another appropriate device that may communicate with the content distributor 120, and conducts a communication session with the content distributor 120 via the communication network 140. The communication session is preferably used for performing an electronic transaction in which the user 150 purchases the content in exchange for a payment as is well known in the art. Upon successful completion of the transaction, the content distributor 120 preferably transmits the content, for example which is not meant to be limiting, to the rendering device 110. By way of a non-limiting example, the rendering device 110 depicted in FIGS. 1A-1D comprises a laptop computer having a communication interface (not shown) which comprises a transmitter and a receiver (both not shown) but it is appreciated that the rendering device 110 may alternatively include any other appropriate rendering device.

It is appreciated that typically there is no privacy or anonymity requirement during purchase of the content, that is, the user 150 typically provides, during the transaction, user details and monetary information which enable purchase of the content in exchange for a payment. Maintaining privacy and anonymity of the user 150 is typically required only after the purchase of the content, when the content is rendered or otherwise used, because it is expected that many users, as well as the user 150, would typically not want others to know what type of content they view or otherwise use, and/or when and where they view or use the content.

Preferably, the content distributor 120 transmits the content in a protected form and in association with a license which specifies a number of copies of the content that are permitted to be rendered at overlapping time periods on separate rendering devices. By way of a non-limiting example, and without limiting the generality of the foregoing, the content is encrypted for protection, and FIGS. 1A-1D and the description below refer to a case in which the user 150 purchases the encrypted content with a single-copy license which specifies that only one copy of the content is permitted to be rendered at a time on a single rendering device. The present invention, in preferred embodiments thereof, seeks to prevent decryption and use of the content at overlapping time periods on more rendering devices than permitted by the license, while maintaining privacy and anonymity of the user 150 and without identification of any rendering device or binding of the content to any rendering device.

It is, however, appreciated that other methods of protecting the content may alternatively be used, and the content may alternatively be purchased with a multiple-copies license which specifies that more than one copy of the content is permitted to be rendered at overlapping time periods on more than one rendering device.

In accordance with a preferred embodiment of the present invention, the content distributor 120 transmits the content to the rendering device 110 in association with the following: first software that is operative to receive the content and to associate keys with the content; identification information (ID) that is associated with the user 150; and second software that comprises a player for rendering the content. It is appreciated that the content distributor 120 may, by way of a non-limiting example, transmit the content, the first software, the ID that is associated with the user, and the second software in an individualized digital package. The first software and the second software may, by way of a non-limiting example, be provided in a single combined software package.

Preferably, at least the first software is tamper resistant. It is appreciated that a secure device, such as a smart card (not shown), may be associated with the rendering device 110 and used to store and run the first software, in which case the first software may be provided to the secure device, for example via an interface (not shown) associating the secure device with the rendering device 110.

The first software may preferably be unique per content and may, by way of a non-limiting example, comprise an obfuscated version of third software. The obfuscated version of the third software is preferably produced for unique association with the content by using an obfuscation scheme. The obfuscated version of the third software is preferably different from any other obfuscated version of the third software which is produced for association with other content by using the obfuscation scheme.

The obfuscation scheme may, by way of a non-limiting example, be based on obfuscation of a source code program written in a meta-language. In such a case, an obfuscating compiler may be used at the server 130 to produce different obfuscated versions of the third software from the same source code program. For example, the obfuscating compiler may produce different obfuscated versions of the third software for use with separate content by employing different implementations of a rendering device-server communication protocol. One non-limiting example of use of obfuscation schemes for production of variable security schemes is described in published PCT Patent Application WO 02/079955 of NDS Limited and corresponding U.S. patent application Ser. No. 10/472,286 of Shen-Orr et al, the disclosures of which have been incorporated herein by reference.

Upon receipt of the content, the first software, the ID that is associated with the user, and the second software at the rendering device 110, the first software is run by a processor (not shown) comprised in the rendering device 110 or associated with the rendering device 110. If the rendering device 110 uses a secure device, the first software may alternatively be run by the secure device or under control of the secure device. By way of a non-limiting example, FIGS. 1A-1D and the description below refer to a case in which the rendering device 110 comprises the processor and the processor runs both the first software and the second software, but it is appreciated that the first software and the second software may alternatively be run by separate elements; for example, the first software may be run by the processor comprised in the rendering device 110 and the second software may be run by an external unit (not shown) that is associated with the rendering device 110.

Preferably, upon running the first software, the processor in the rendering device 110 generates an asymmetric key pair comprising a public key and a private key K. The processor then associates the key pair with the content, thus producing a local digital package which comprises the following: the content associated with the key pair; the first software; the ID that is associated with the user; and the second software. The processor preferably generates the key pair by interacting with the content distributor 120 and using any appropriate algorithm for asymmetric key generation known in the art and a conventional random-number generator (RNG) or pseudo-random number generator (PRNG) (both not shown).

Preferably, the processor interacts with the content distributor 120 for generating the key pair in order to overcome possible attempts to copy the content and to produce a different and illegitimate key pair which may be usable for rendering the content. In such a case, the first software executes a conventional zero-knowledge proof of authenticity scheme in which the content distributor 120 proves to the processor that it knows a secret without revealing the secret itself. The zero-knowledge proof of authenticity scheme may, by way of a non-limiting example, comprise the Fiat-Shamir zero-knowledge authentication scheme described in European Patent EP 0325238, the disclosure of which has been incorporated herein by reference. It is appreciated that if the content is copied and an attempt is made to illegitimately produce a different key pair which may be usable for rendering the content, then the zero-knowledge proof of authenticity scheme executed during production of the different key pair would fail thus preventing generation of any different key pair which may be usable for rendering the content.

It is further appreciated that in order to prevent possible eavesdropping during interaction between the processor in the rendering device 110 and the content distributor 120, a conventional secure channel may be established between the processor and the content distributor 120 during generation of the key pair using, for example which is not meant to be limiting, Secure Sockets Layer (SSL) as is well known in the art.

Preferably, in order for the content to be rendered or otherwise used, typically after purchase thereof, the rendering device 110 must receive some information, such as a key or a control word, which enables decryption in combination with rendering of the content. Therefore, upon the user 150 attempting to render the content on the rendering device 110, the first software or the second software may preferably prompt the user 150 to establish communication with the server 130 in order to obtain the key or the control word.

Upon establishing the communication with the server 130, for example via a modem (not shown) comprised in or associated with the rendering device 110, the server 130 and the processor in the rendering device 110 preferably execute, via the communication network 140, a communication protocol in which the server 130 preferably provides to the processor information, such as a key or a control word, which is necessary for rendering or using the content in exchange for the processor providing the following information to the server 130: a number representation X which comprises a number representation in bits of a result obtained from encrypting together a number representation of a present time interval and the ID, both encrypted with the public key; and a number representation Y which comprises a number representation in bits of a share (SH) of the private key K.

The present time interval may, for example, be a time interval of a predefined length. For example, the time interval of a predefined length may comprise a 5-minute long time interval, in which case the present time interval may comprise any identified one of 288 time intervals within a 24-hour period.

The processor preferably generates the share SH of the private key K using a secret sharing scheme as is well known in the art. An example of a secret sharing scheme well known in the art is described in the above-mentioned article entitled "How to share a secret", by Adi Shamir in *Communications of the ACM,* 22(1), pages 612-613, 1979, available at www.cs-.tau.ac.il/~bchor/Shamir.html, the disclosure of which has been incorporated herein by reference.

By way of a non-limiting example, the share SH may be generated as follows. When generating the key pair, the processor uses the RNG or PRNG to generate a random number L having the same number of bits as the private key K. By way of a non-limiting example, the number of bits of each of the private key K and the random number L may be between 1024 and 2048, or, in a case where encryption of the content is performed using elliptic curves, the number of bits of each of the Private key K and the random number L may, for example, be 160.

The processor then obtains a large public prime P which has more bits than each of the private key K and the random number L. Then, the processor uses the RNG or PRNG to generate two random or pseudo-random numbers R1 and R2. Preferably, the RNG or PRNG are designed such as to give different results when run on separate processors; thus, R1 and R2 generated by one processor of a first rendering device are different from R'1 and R'2 generated by another processor of a second rendering device, respectively. The RNG normally provides different results when run on different processors. The PRNG preferably uses as input, in order to provide such different results when run on different processors, data from at least one data source that is hard to predict and/or data from at least one data source that is unique. Non-limiting examples of a data source that is hard to predict include: a high-precision timer like TSC in Intel® machines; and a list of active processes of a processor associated with the PRNG, optionally combined with dynamic characteristics of such active processes. Non-limiting examples of a data source that is unique include: a medium access control (MAC) address associated with a computer; an identification code of a computer motherboard; and an identification code of an STB.

Additional appropriate examples of a data source that is unique, which are based on system identification, are described in published PCT Patent Application WO 02/079955 of NDS Limited, and corresponding U.S. patent application Ser. No. 10/472,286 of Shen-Orr et al, the disclosures of which have been incorporated herein by reference.

It is appreciated that in generation of R1 and R2 the processor may optionally use a random input received from the content distributor 120 in order to overcome possible attempts to clone R1 and R2. Using the random input received from the content distributor 120 is useful in overcoming cloning of R1 and R2 because if, for example, the user 150 distributes the content, the first software, the ID that is associated with the user, and the second software without authorization to unauthorized rendering devices, and the unauthorized rendering devices interact with the content distributor 120 in order to generate cloned R1 and R2, the unauthorized rendering devices would naturally receive other random inputs from the content distributor 120 which cannot be used to produce cloned R1 and R2 even if users of the unauthorized rendering devices manage to clone all other data and/or inputs used in generation of R1 and R2.

Preferably, the processor may apply a hash function on any one or combination of the following in order to obtain a hash result: the random input received from the content distributor 120; the at least one data source that is hard to predict; the at least one data source that is unique; a local random number generated by the RNG; and a local pseudo-random number generated by the PRNG. The processor may then use the hash result as an input to the RNG or PRNG for producing R1 and R2.

The large public prime P may be a global parameter which may, for example, be determined once, for example at the content distributor 120 and transmitted to many rendering devices including the rendering device 110.

Once the processor obtains K, L, R1, R2 and P, the processor calculates a number W as follows:

$$W=(R1*K+R2*L) \bmod P$$

where "*" indicates regular multiplication, and "mod" indicates modulo arithmetic.

The share SH is then given by an ordered triple of the numbers R1, R2, and W, that is:

$$SH=(R1,R2,W).$$

When an additional share SH' of the private key K is calculated or otherwise obtained, where SH'=(R'1, R'2, W'), the following set of regular equations may be created with K and L as variables:

$$W=(R1*K+R2*L)\bmod P$$

$$W'=(R'1*K+R'2*L)\bmod P$$

Such a set of regular equations may be solved to obtain values of K and L as is well known in the art (even in mod P, when P is a prime number).

It is apparent from the above-mentioned example of share generation that one share provides a single equation with two variables which has an infinite number of solutions and thus the private key cannot be reconstructed from a single share, but when there are two shares, a set of two regular equations is provided which may be solved to reconstruct the private key K.

The random numbers R1 and R2 are preferably uniquely generated by the processor in the rendering device 110, and, as mentioned above, a separate processor of a separate rendering device typically generates random numbers R'1 and R'2 which are different from R1 and R2, respectively. Differences among such random numbers generated by separate processors of separate rendering devices result in differences in shares of the private key K which are generated by the separate processors, and such differences may preferably be used, as described below, to indicate that there are separate rendering devices in which attempts are made to render the content. Such attempts are preferably checked to prevent unauthorized rendering and use of the content at overlapping time periods on more rendering devices than permitted by the license associated with the content as described below.

The user 150 may copy the content to another rendering device 160, or transmit the content to the rendering device 160, for example via the network 140 or via a home network (not shown). When copying or transmitting the content to the rendering device 160 the local digital package is, in fact, copied or transmitted to the rendering device 160 and thus the rendering device 160 actually receives the first software and the second software, the ID associated with the user 150, and the content associated with the key pair comprising the public key and the private key K. It is appreciated that the random number L is also associated with the content and is also comprised in the local digital package, and thus when the local digital package is copied or transmitted to the rendering device 160, the rendering device 160 also receives the random number L.

The rendering device 160 may, by way of a non-limiting example, be located in another room at the premises of the user 150 as shown, for example, in FIGS. 1A-1D, and may comprise, by way of a non-limiting example, a desktop computer 170 associated with a display 180. The system 100 allows such copying or transmission of the content and rendering of the content on other rendering devices, such as the rendering device 160, because it is assumed that there may be more than one rendering device at the user premises, and the user 150 may legitimately prefer to render the content at different time periods on different rendering devices. However, as described below, the system 100 does not allow rendering or use of the content on a plurality of rendering devices at overlapping time periods if the license associated with the content does not permit rendering on a plurality of rendering devices.

FIG. 1A depicts a case in which the server 130 detected an attempt to render the content at overlapping time periods on both the rendering device 110 and the rendering device 160 contrary to terms of the license associated with the content, and, as a result of such detection, the server 130 displays a message on the rendering device 160, which message indicates that the content cannot be rendered on the rendering device 160 because it is already rendered on another rendering device. FIGS. 1B-1D show information communicated among the server 130 and the rendering devices 110 and 160, which information is used to assist in the detection of the attempt mentioned with reference to FIG. 1A to render the content at overlapping time periods on both the rendering device 110 and the rendering device 160.

In FIG. 1B, the rendering device 110 generates the pair of random numbers (R1, R2) and the share SH of the private key, and produces the local digital package. The rendering device 110 in FIG. 1B then transmits a copy of the local digital package generated thereat to the rendering device 160 via the communication network 140 in response to a command by the user 150.

In FIG. 1C, the rendering device 160 generates, upon receipt of the copy of the local digital package from the rendering device 110, another pair of random numbers (R'1, R'2) which is different from the pair (R1, R2) generated in the rendering device 110. The rendering device 160 also produces, based on the pair (R'1, R'2), another share SH' which is different from the share SH produced in the rendering device 110. It is appreciated that a new share is generated for every rendering of the content in every one of the rendering devices 110 and 160.

In FIG. 1D, the user 150 attempts to render the content on the rendering device 110, and, at substantially the same time, another user 190, such as a child of the user 150, attempts to render a copy of the content comprised in the copy of the local digital package received at the rendering device 160. Upon attempting to render the content on the rendering device 110, the rendering device 110 generates a pair of number representations X, Y, where the number representation X comprises a number representation in bits of a result obtained from encrypting together a number representation of a time interval in which the attempt is made to render the content on the rendering device 110 and the ID associated with the user 150, both encrypted with the public key, and the number representation Y comprises a number representation in bits of the share SH of the private key K.

Similarly, upon attempting to render the copy of the content on the rendering device 160, the rendering device 160 generates a pair of number representations X', Y', where the number representation X' comprises a number representation in bits of a result obtained from encrypting together a number representation of a time interval in which the attempt is made to render the content on the rendering device 160 and the ID associated with the user 150, both encrypted with the public key, and the number representation Y' comprises a number representation in bits of the share SW. The rendering devices 110 and 160 preferably transmit the respective number representations X, Y and X', Y' to the server 130 via the communication network 140.

Since the attempt to render the content on the rendering device 110 and the attempt to render the copy of the content on the rendering device 160 occur within the same time interval, the number representations X and X' are identical. However, the number representations Y and Y' are different. It is appreciated that the number representations Y and Y' will always be different if generated by different rendering devices, whereas the number representations X and X', when associated with the same ID, will be different if generated for rendering during different time intervals and identical if generated for rendering during the same time interval.

Preferably, the server 130 executes a sorting process according to the X number representation part. Such a sorting process is preferably executed every time interval of a predefined length that has ended, or even in real-time if the server 130 has sufficient processing resources. The time interval of a predefined length may, by way of a non-limiting example, comprise a time interval of a length similar to the length of the time interval used in production of the number representation X, that is, 5 minutes, or a time interval of a different length.

Preferably, upon the server 130 detecting, based on execution of the sorting process on a time interval that has ended or real-time, that the received number representations X and X' are identical but the received number representations Y and Y' are different, the server 130 determines that rendering attempts on rendering devices from which the pairs X, Y and X', Y' were received, that is the rendering devices 110 and 160, are contrary to terms of the license. In response to such a determination, the server 130 may transmit a message, for example to the rendering device 160, which message is the message mentioned above with reference to FIG. 1A and depicted in FIG. 1A.

The server 130 may also use the different shares SH and SH' in the respective number representations Y and Y' to reconstruct the private key K. Once the server 130 reconstructs the private key K the server 130 may use the private key K to find the ID that is associated with the user 150. Once the ID associated with the user 150 is found, the server 130 may also apply sanctions against the user 150 and disable rendering of the content, for example on both the rendering devices 110 and 160. It is appreciated that the server 130 may alternatively allow present rendering of the content on both the rendering devices 110 and 160, in which case the server 130 does not transmit the message mentioned above to the rendering device 160, but only disables future rendering of the content on both the rendering devices 110 and 160.

It is further appreciated that the server 130 is capable of such disabling of present or future rendering of the content on both the rendering devices 110 and 160 because in order to enable continuous rendering of the content on the rendering devices 110 and 160 the server 130 must provide every short time period, such as, by way of a non-limiting example, every second, a key or a control word which is necessary for rendering the content to the rendering devices 110 and 160. The server 130 transmits the key or the control word to the rendering devices 110 and 160 only in exchange for receiving from the rendering devices 110 and 160 the respective X, Y pairs every time interval of a predefined length, and thus if the server 130 finds, by analyzing the respective X, Y pairs, that rendering attempts contrary to the terms of the license have been made, the server 130 may simply stop providing the key or the control word to the rendering devices 110 and 160 thus disabling the rendering devices 110 and 160 from rendering the content from about the time when the server 130 has stopped providing the key or the control word.

It is appreciated that a scheme in which the server 130 transmits a key or a control word to rendering devices for rendering content only in exchange for receiving from the rendering devices respective X, Y pairs on each attempt to render the content and every time interval during which the content is to be rendered may be implemented using a conventional server-client protocol which may, by way of a non-limiting example, be obfuscated by an obfuscating compiler as mentioned above.

Preventing and/or sanctioning rendering of the content at overlapping time periods on more rendering devices than permitted by the license associated with the content as mentioned above may also discourage the user 150 from making pirate copies of the authorized content and from transmitting unauthorized copies of the content to other users. Such piracy is expected to be discouraged because once any two users receiving unauthorized copies of the content will attempt to render the unauthorized copies of the content at overlapping time periods, typically without being aware of each other's attempt, the server 130 may disable all such unauthorized renderings as well as disable rendering of the authorized copy of the user 150. Since such cases may occur frequently, detection of the piracy is expected to occur within a typically short time period from distribution of the unauthorized copies of the content, thus making such piracy ineffective.

When no attempt is made to render the content at overlapping time periods on more rendering devices than permitted by a license associated with the content, the server 130 cannot reconstruct the private key K associated with the rendering device 110 because the server 130 only receives a share of the private key K which is insufficient for revealing the private key K. The private key K is therefore normally kept secret and the server 130 cannot normally identify the rendering device 110 during rendering of the content or bind the content to the rendering device 110. Only if the server 130 determines an attempt to render the content at overlapping time periods on more rendering devices than permitted by the license in which the rendering device 110 is involved, the server 130 may reconstruct the private key K associated with rendering device 110, but the server 130 still cannot reconstruct private keys associated with rendering devices which are not involved with such an attempt.

It is appreciated that typically the license associated with the content allows the user 150 to render the content on different rendering devices at separate time periods. For example, if the content comprises a copy of a movie, the user 150 may purchase the copy of the movie and display the movie on the rendering device 110 that may, for example, be located in a study, and then decide to view the movie with a child on the rendering device 160 which may, for example, be located in a child's room. In such a case, after ceasing rendering of the movie on the rendering device 110, the user 150 may transmit the copy of the movie to the rendering device 160, for example, via a home network (not shown). The user 150 may then watch the movie with the child on the display 180 in the child's room without the server 130 determining that an attempt has been made to render the content at overlapping time periods on more rendering devices than permitted by the license.

Preferably, basing the number representation X on a present time interval enables resolution of cases in which the user 150 ceases rendering of the movie on the rendering device 110 and begins rendering of the movie on the rendering device 160 a short time thereafter but within the same time interval. In such cases, upon ceasing rendering of the movie on the rendering device 110, the processor in the rendering device 110 either terminates communication with server 130 thus letting the server 130 know that rendering of the movie on the rendering device 110 has terminated, or computes a rendering ceasing time, determines the present time interval as an interval containing the rendering ceasing time, and transmits an indication of the rendering ceasing time to the server 130 to inform the server 130 that rendering of the movie on the rendering device 110 has terminated.

When beginning rendering of the movie on the rendering device 160 during the same time period in which rendering of the movie on the rendering device 110 was terminated, the server 130 is already aware of termination of rendering of the movie on the rendering device 110, and thus the server 130 will not generate a determination that an attempt has been made to render the movie at overlapping time periods on more rendering devices than permitted by the license associated with the content.

By way of example, the server 130 may execute the above-mentioned sorting process every 5 minutes and the user 150 may render the movie on the rendering device 110 till, for example, the time 13:00. At 13:00, the rendering device 110 transmits a pair of computed number representations X, Y to the server 130, and then at, for example, 13:03 the user 150 ceases rendering the movie on the rendering device 110. Then at, for example 13:05, the user 150 begins rendering of the movie on the rendering device 160. The rendering device 110 lets the server 130 know that rendering of the movie has ceased at 13:03, either by terminating communication with the server 130 at 13:03 or by transmitting an indication of the rendering ceasing time 13:03.

When rendering of the movie on the rendering device 160 begins at 13:05, the rendering device 160 transmits a pair of computed number representations X', Y' to the server 130, where the number representations X', Y' are different from the number representations X, Y. Since the number representations X and X', respectively provided by the rendering devices 110 and 160 to the server 130, are different, the server 130 will not generate a determination that an attempt has been made to render the movie at overlapping time periods on more rendering devices than permitted by the license associated with the content.

However, if at, for example 13:07, another user who received a pirate copy of the movie from the user 150 attempts to render the pirate copy of the movie on a separate rendering device, the server 130 will receive from the separate rendering device a pair of computed number representations X", Y" which pertain to the pirate copy of the movie, where X'=X" and Y'≠Y". When performing the sorting process on the time period between 13:05 and 13:10, the server 130 will generate a determination that an attempt has been made to render the movie at overlapping time periods on more rendering devices than permitted by the license associated with the movie based on the identical number representations X' and X" and the different number representations Y' and Y" received between 13:05 and 13:10 from the rendering device 160 and the separate rendering device, respectively.

It is appreciated that various sub-combinations of the system 100 of FIGS. 1A-1D may comprise alternative preferred embodiments of the present invention. For example, and without limiting the generality of the foregoing, each of the following may, comprise an alternative preferred embodiment of the present invention: each of the rendering devices 110 and 160; the server 130; the content distributor 120; and the communication network 140.

Reference is now made to FIG. 2, which is a simplified flowchart illustration of a preferred method of operation of the system 100 of FIGS. 1A-1D. The method of FIG. 2 is self-explanatory.

It is appreciated that software components of the present invention may, if desired, be implemented in ROM (read only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the claims which follow:

What is claimed is:

1. A method for preventing rendering of content at overlapping time periods on more rendering devices than permitted by a license associated with the content, the method comprising:

transmitting the following to a rendering device of a user: the content, first software, identification information (ID) that is associated with the user, and second software that comprises a player for rendering the content, wherein the first software is operative to: generate an asymmetric key pair comprising a public key and a private key, and associate the key pair with the content thus producing a local digital package comprising the content associated with the key pair, the first software, the ID associated with the user and the second software;

receiving a pair of number representations X,Y from the rendering device of the user during rendering of the content, wherein the number representation X comprises a number representation in bits of a result obtained from encrypting together a number representation of a time interval in which an attempt is made to render the content on the rendering device of the user and the ID, both encrypted with the public key of the key pair, and wherein the number representation Y comprises a number representation in bits of a randomly generated share SH of the private key of the key pair, wherein the share SH comprises a portion of the private key such that the private key may be revealed when n+1 shares of the private key are known, but when only n shares of the private key or less than n shares are known, the private key cannot be revealed, wherein n is a number of rendering devices permitted by the license;

receiving additional pairs of number representations X,Y from a plurality of further rendering devices which have received the local digital package from the rendering device of the user;

detecting an attempt to render the content at overlapping time periods on more rendering devices than permitted by the license associated with the content based on a determination that n+1 different number representations Y are paired with the same number representation X;

reconstructing the private key of the key pair, in response to the detecting, by using the shares in the n+1 number representations Y;

identifying the ID based on the reconstructed private key; and preventing rendering of the content on all rendering devices associated with the ID.

2. The method according to claim 1 and wherein the transmitting comprises transmitting the content, the first software, the ID, and the second software in an individualized digital package.

3. The method according to claim 1 and wherein the first software and the second software are comprised in a single combined software package.

4. The method according to claim 1 and wherein the first software comprises an obfuscated version of third software, the obfuscated version of the third software being produced for association with the content by using an obfuscation scheme.

5. The method according to claim 4 and wherein the obfuscated version of the third software is different from any other obfuscated version of the third software which is produced for association with other content by using said obfuscation scheme.

6. The method according to claim 4 and wherein the obfuscated version of the third software comprises a source code program obfuscated by an obfuscating compiler operating thereon.

7. The method according to claim 6 and wherein the obfuscating compiler produces different obfuscated versions of the third software by employing different implementations of a rendering device-server communication protocol.

8. The method according to claim 1 and also comprising, prior to the transmitting:
encrypting the content,
and wherein the content comprises the content in an encrypted form.

9. The method according to claim 1 and wherein the time interval comprises a time interval of a predefined length.

10. The method according to claim 9 and wherein the time interval of a predefined length comprises a 5-minute long time interval.

11. The method according to claim 1 and wherein the share SH of the private key is based upon two numbers R1 and R2 which are generated by a number generating process which is chosen such that a first R1 and a first R2 generated by a first rendering device differ respectively from a second R1 and a second R2 generated by a second rendering device.

12. The method according to claim 11 and wherein each of R1 and R2 comprises one of the following: a random number, and a pseudo-random number.

13. The method according to claim 11 and wherein R1 and R2 are generated based on any one or combination of the following: a random input received from a content distributor, at least one data source that is unique, a local random number generated by a random number generator (RNG), and a local pseudo-random number generated by a pseudo-random number generator (PRNG).

14. The method according to claim 1 and wherein the content comprises at least one of the following: a television program, an audio program, video information, audio information, multimedia information, data, a game, and information from a computer based network.

15. The method according to claim 1 and wherein the rendering device comprises at least one of the following: a computer, a personal digital assistant (PDA) having a communication interface, a set-top box (STB) associated with a television and having a communication interface, a mobile telephone, a game console associated with a display, and a game console comprising a display.

16. The method of claim 1, wherein said preventing rendering comprises preventing present rendering or future rendering of the content.

17. A system for preventing rendering of content at overlapping time periods on more rendering devices than permitted by a license associated with the content, the system comprising:
a transmitter device which is operative to transmit the following to a rendering device of a user: the content, first software, identification information (ID) that is associated with the user, and second software that comprises a player for rendering the content, wherein the first software is operative to: generate an asymmetric key pair comprising a public key and a private key, and associate the key pair with the content thus producing a local digital package comprising the content associated with the key pair, the first software, the ID associated with the user and the second software;
a receiver device which is operative to perform the following:
receive a pair of number representations X,Y from the rendering device of the user during rendering of the content, wherein the number representation X comprises a number representation in bits of a result obtained from encrypting together a number representation of a time interval in which an attempt is made to render the content on the rendering device of the user and the ID, both encrypted with the public key of the key pair, and wherein the number representation Y comprises a number representation in bits of a randomly generated share SH of the private key of the key pair, wherein the share SH comprises a portion of the private key such that the private key may be revealed when n+1 shares of the private key are known, but when only n shares of the private key or less than n shares are known, the private key cannot be revealed, wherein n is a number of rendering devices permitted by the license; and
receive additional number representations X,Y from a plurality of further rendering devices which have received the local digital package from the rendering device of the user; and
a server device which is operative to perform the following:
detect an attempt to render the content at overlapping time periods on more rendering devices than permitted by the license associated with the content based on a determination that n+1 different number representations Y are paired with the same number representation X;
reconstruct the private key of the key pair by using the shares in the n+1 number representations Y;
identify the ID based on the reconstructed private key; and
prevent rendering of the content on all rendering devices associated with the ID.

18. A system for preventing rendering of content at overlapping time periods on more rendering devices than permitted by a license associated with the content, the system comprising:
means for transmitting the following to a rendering device of a user: the content, first software, identification information (ID) that is associated with the user, and second software that comprises a player for rendering the content, wherein the first software is operative to: generate an asymmetric key pair comprising a public key and a private key, and associate the key pair with the content thus producing a local digital package comprising the content associated with the key pair, the first software, the ID associated with the user and the second software;
means for receiving which is operative to perform the following:
receive a pair of number representations X,Y from the rendering device of the user during rendering of the content, wherein the number representation X comprises a number representation in bits of a result obtained from encrypting together a number representation of a time interval in which an attempt is made to render the content on the rendering device of the user and the ID, both encrypted with the public key of the key pair, and wherein the number representation Y comprises a number representation in bits of a randomly generated share SH of the private key of the key pair, wherein the share SH comprises a portion of the private key such that the private key may be revealed when n+1 shares of the private key are known, but when only n shares of the private key or less than n shares are known, the private key cannot be revealed, wherein n is a number of rendering devices permitted by the license; and receive additional number representations X,Y from a plurality of further rendering devices which have received the local digital package from the rendering device of the user; and means for processing which is operative to perform the following:

detect an attempt to render the content at overlapping time periods on more rendering devices than permitted by the license associated with the content based on a determination that n+1 different number representations Y are paired with the same number representation X;

reconstruct the private key of the key pair by using the shares in the n+1 number representations Y;

identify the ID based on the reconstructed private key; and prevent rendering of the content on all rendering devices associated with the ID.

\* \* \* \* \*